United States Patent [19]

Ferraro

[11] Patent Number: 4,697,342
[45] Date of Patent: Oct. 6, 1987

[54] CAP FOR RAZOR BLADE ASSEMBLY ADAPTED TO RECEIVE AN EXTRA ELEMENT

[75] Inventor: Frank A. Ferraro, Trumbull, Conn.

[73] Assignee: Warner Lambert Company, Morris Plains, N.J.

[21] Appl. No.: 887,305

[22] Filed: Jul. 21, 1986

Related U.S. Application Data

[63] Continuation-in-part of Ser. No. 824,498, Jan. 31, 1986, Pat. No. 4,683,096.

[51] Int. Cl.⁴ .............................................. B26B 21/44
[52] U.S. Cl. ...................................................... 30/41
[58] Field of Search ...................... 264/249; 30/41, 84

[56] References Cited

U.S. PATENT DOCUMENTS

| 2,431,238 | 11/1947 | Friedman | 264/249 |
| 2,500,897 | 3/1950 | Friedman | 264/249 X |
| 3,486,225 | 12/1969 | Regan | 30/41 |
| 4,170,821 | 10/1979 | Booth | 30/41 |

FOREIGN PATENT DOCUMENTS

| 475074 | 8/1969 | Switzerland | 30/41 |

Primary Examiner—E. R. Kazenske
Assistant Examiner—Michael D. Folkerts
Attorney, Agent, or Firm—Howard Olevsky; Stephen Raines

[57] ABSTRACT

This invention relates to a razor blade assembly and particularly to a cap for blade assembly in which a rectangular shaving aid has been attached by means of deformable positioning means extending upward from the cap.

2 Claims, 4 Drawing Figures

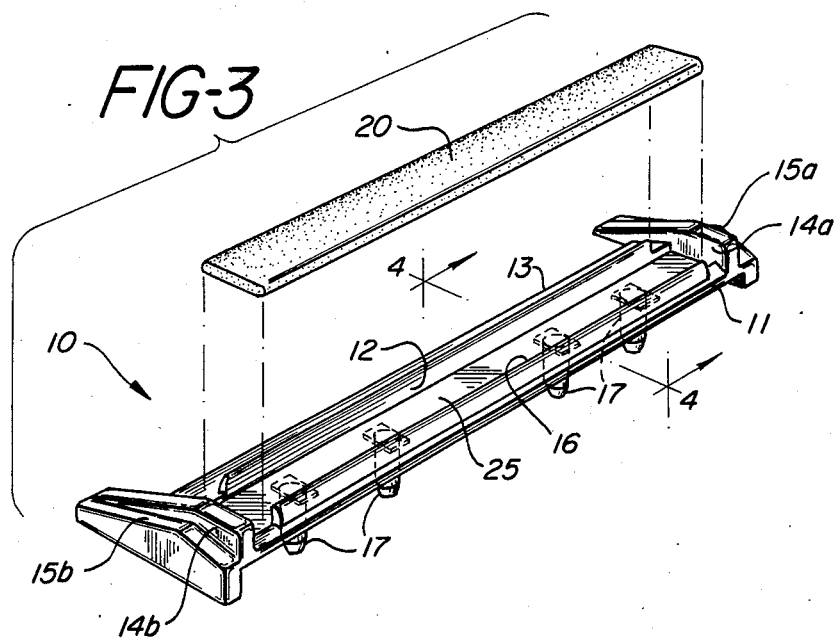
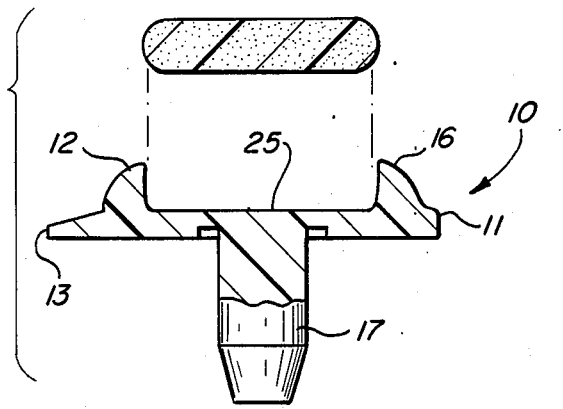

CAP FOR RAZOR BLADE ASSEMBLY ADAPTED TO RECEIVE AN EXTRA ELEMENT

CROSS REFERENCE TO RELATED APPLICATION

This application is a continuation-in-part of U.S. patent application Ser. No. 824,498 filed Jan. 31, 1986, U.S. Pat. No. 4,683,096.

FIELD OF THE INVENTION

This invention relates to a razor blade assembly and particularly to a cap for a blade assembly in which a shaving blade has been attached.

BACKGROUND OF THE INVENTION

U.S. Pat. No. 4,170,821 issued to Booth on Oct. 16, 1979 discloses a solid water soluble shaving aid incorporated as a strip attached to a disposable razor blade cartridge. Cartridges having such shaving aids attached to the cap are currently marketed with the aid being mixed in polystyrene. Currently, polyethylene oxide is the shaving aid preferred. Examples of cartridges with these soluble shaving aids sold by as "Atra Plus TM " by Gillette Company, Boston, Mass. and "Ultrex Plus TM " sold by Warner-Lambert Company, Morris Plains, N.J. (Cartridges as used herein are blade assemblies sold as individual items for attachment to a separate handle. Blade assembly is used generically to include both the cartridge and that part of a unitary disposable razor other than the handle. The cartridge and blade assembly include at least one blade, a seat for the blade, a guard bar extending from the seat, and a cap and means for separating the blades, if more than one blade is used, and means for maintaining blade position.)

While location of the lubricating strip on the cap has proven to be desirable because of the liberation of lubricant with each razor stroke, the attachment of the plastic strip in which the polyethylene oxide lubricant has been impregnated, has proven to be difficult. Both the "Atra Plus" and the "Ultrex Plus" cartridge have the lubricating strip adhesively secured to the cap of the blade assembly. Adhesive securement requires the separate steps during the manufacturing process of contacting the cap with adhesive, precisely locating the lubricating strip to be in registery with the adhesive and, finally, clamping the strip to insure proper adhesive bonding. Not only do these additional steps dramatically slow the process but the cost of the adhesive and the problems associated in working with a necessarily quick-drying plastic bonding adhesive with a volatile organic solvent add unnecessary time and complexity to what is otherwise a ultra high speed manufacturing process.

SUMMARY OF THE INVENTION

This invention provides a shaving assembly and particularly a shaving assembly cap particularly adapted to receive and clamp a lubricating strip without the use of adhesive. The cap, according to this invention, utilizes projections which extend upward from the cap at both the front and rear portion of the cap defining a pocket which receives the lubricating strip. After the strip has been positioned, the projections which have sufficient deformability and plasticity, are then bent over the strip to maintain it without the defined space between the projections. Bosses are present at each side of the strip after insertion to prevent lateral displacement. It is the bosses and projections, which, in combination, define the strip receiving pocket.

DETAILED DESCRIPTION OF THE INVENTION

The invention may be more readily understood in reference to the drawings in which:

FIG. 3 is an end perspective view of a second embodiment of this invention; and

FIG. 4 is a cross section taken along the lines 4—4 of FIG. 3.

Figure 1:
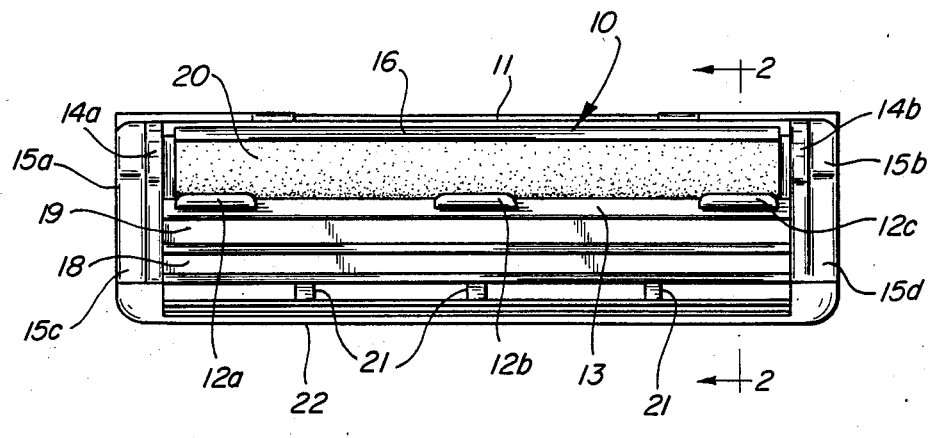
FIG. 1 is a plane view of a cap used in conjunction with a razor blade assembly according to this invention.

As shown in FIGS. 1 and 4 the razor cap 10 of blade assembly B has a back surface 11 and a front surface 13 and sides 15a and 15b. As shown in FIG. 1, the lubricating strip 20 is partially overlaid by projection 16 which extends along the entire length of the rear portion of the strip 20. The lubricating strip 20 is also held in place and the front portion of the razor cap by tabs 12a, 12b and 12c positioned as shown in FIG. 1. Bosses 14a and 14b positioned inward along the sides 15a and 15b respectively prevent lubricating strip 20 from shifting laterally either during insertion or use. Tapering downward from the front of the cap 13 and extending from sides 15a and 15b respectively are legs 15c and 15d. Positioned between the legs 15c and 15d adjacent and partially underlying the front portion of the cap 13 is a top blade 19 and a bottom blade 18 with the bottom blade 18 extending outward farther than the top or cap blade 19. Ribs 21 extend toward guard bar 22 extend outwardly beneath the blades 18 an 19 as projections below and at part of, a blade seat (not otherwise shown). These ribs 21 extend parallel to the legs 15c and 15d and join guard bar 22 which is designed to protect the face of the shaver during the shaving operation itself.

The configuration of the front projections, i.e., the 3 tabs illustrated in FIG. 1 is a currently preferred clamping configuration for providing secure multi-position clamping along the front portion of the cap with maximum exposure of the lubricating strip. It is also possible to use this multitab configuration for the rear projection but, due to the nature of the forces exerted during shaving, multiple tabs are not as important in the rear portion of the cap. The blade assembly depicted in FIG. 1 as illustrated in FIG. 2 is held in place by staking means 17, the spacing of which can be seen by reference to FIG. 2 and FIG. 3.

The particular method of maintaining the assembly configuration is not part of this invention and any of the well known means can be utilized including staking with positioning as shown in FIG. 3 with stakes extending either downward from the cap or upward from the seat or combinations thereof. Staking can occur upwardly from the seat, engaging the bottom or seat blade and downwardly from the cap engaging the cap blade with the stakes terminating at the opposite blade maintaining the position of the components by upward and downward pressure against these blades. Other common assembly means can also be used. For example the cap and seat may be formed of resilient fingers acting as leaf springs and this method may be used alone or in conjunction with assorted stakes and detents to maintain relative positioning of the components of the blade assembly, the particular choice of assembly maintenance means is well known by those skilled in the art.

Figure 2:
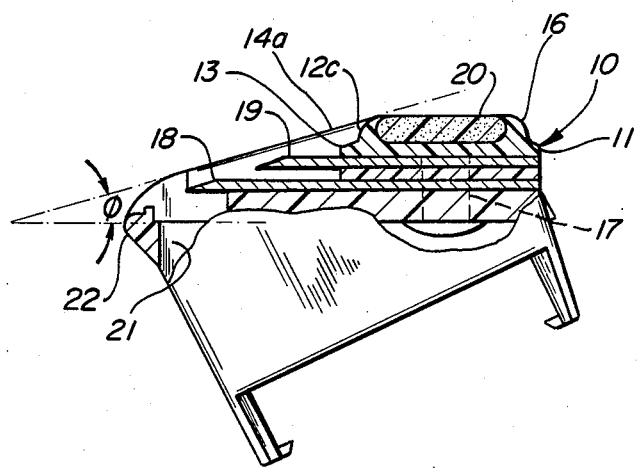
FIG. 2 is a cross sectional view taken along the lines 2—2 of FIG. 1.

FIG. 2 is illustrative of the relationship between the staking tab and lubricating strip and their position and indicates that, at the place where tab 12c is positioned, in cross section, the tab 12c and 16 overlay the lubricating strip 20 as shown therein and positioned directly above staking means 17.

According to this invention it is preferred that the projection 16 on the back 11 of cap 10 be essentially a solid continuous strip. Shaving itself exerts a backward pressure on the projection area 16 and the continuous strip offers better resistance than a single tab or a plurality of tabs although other configurations can of course be used as long as they extend essentially along the entire length of the back 11 of cap 10.

Referring now to FIG. 3 in which a second embodiment of the cap is shown. This Fig. does not show the presence of the lubricating strip 20 which is inserted in the central part of the cap 25 but does illustrate the receiving pocket formed by the bosses and the projections. FIG. 3 shows a continuous projection 12 positioned along the front portion 13 of the cap 10 and also shows the positioning of the cap face at an angle relative to the plane formed by the bottom of cap sides 15a and 15b. It is currently preferred that the lubricating strip be angled with respect to the cap bottom surface at an angle up to about 30° (see angle $\phi$ in FIG. 2) so that it correlates with contact shaving angle of the blades and the blade assembly. The shaving angle can vary depending upon whether there is a single or multiple blade or whether the razor is designed for maximum or minimum exposure. Although these features are well known within the art and are not part of this invention.

The lubricating strip is added to the cap illustrated in FIG. 3 by positioning the cap over the pocket formed by bosses 14a and 14b projections 16 and 12 and the central portion of the cap 25 defined by these projections. Once the strip 20 is in place, as illustrated in FIG. 1, the projections 16 and 12 regardless of their shape are bent inward toward each other and overlay a portion of the cap thereby serving to retain it along with the bosses which could be extended and bent over at the ends, however, because the forces exerted during shaving are not directed along the length of the blade, the bosses need not be bent but need merely serve as abuttments.

We claim:
1. A substantially rectangular razor cap comprising:
    (a) a substantially planar bottom surface;
    (b) a top surface having;
        (i) at least one unitary deformable narrow rear projection positioned parallel to and near the back of said top surface;
        (ii) at least one unitary deformable narrow front projection positioned parallel to said rear projection; and
    (c) a substantially rectangular lubricating strip positioned between said front and rear projections; said strip having a face-contacting planar surface forming an angle of not more than 30° from the bottom surface of said cap.
2. The cap of claim 1 wherein blade positioning means depend downward from said cap bottom surface.

* * * * *